United States Patent [19]
Shaffer

[11] 3,728,423
[45] Apr. 17, 1973

[54] MATCHING THE VOLUME SHRINKAGE OF ORGANIC FIBERS TO THAT OF THE RESIN MATRIX IN CARBON OR GRAPHITE COMPOSITES

[75] Inventor: Robert C. Shaffer, Playa Del Rey, Calif.

[73] Assignee: Hitco

[22] Filed: Mar. 30, 1972

[21] Appl. No.: 239,722

[52] U.S. Cl..................264/29, 264/DIG. 19, 264/82
[51] Int. Cl.....C04b 35/52, C04b 35/54, C04b 35/72
[58] Field of Search..........................264/29, DIG. 19, 264/82; 423/447

[56] References Cited

UNITED STATES PATENTS

| | | | |
|---|---|---|---|
| 3,174,895 | 3/1965 | Gibson et al. | 264/29 |
| 3,233,014 | 2/1966 | Bickerdike et al. | 264/29 |
| 3,238,054 | 3/1966 | Bickerdike et al. | 264/29 |
| 3,294,489 | 12/1966 | Millington et al. | 264/DIG. 19 |
| 3,462,289 | 8/1969 | Rohl et al. | 264/DIG. 19 |
| 3,544,530 | 12/1970 | Shaffer | 117/124 |
| 3,579,401 | 5/1971 | Cauville et al. | 264/DIG. 19 |
| 3,639,197 | 2/1972 | Spain | 161/42 |
| 3,672,936 | 6/1972 | Ehrenreich | 264/29 |

Primary Examiner—Donald J. Arnold
Assistant Examiner—John H. Miller
Attorney—Robert H. Fraser et al.

[57] ABSTRACT

Organic fibers are partially carbonized to match their volume shrinkage upon complete carbonization to that of the resin matrix. Improved carbonized composite parts are manufactured with high reliability and low failure rates despite high adhesion between initially partially carbonized fiber surfaces and encompassing matrix resins during temperature cycling occurring in processing. Partially carbonized fibers having active surface components are firmly adhered to matrices comprising flexible but self-supporting thermosetting resin materials of carbonizable character. A composite part of complex shape and thin wall sections may be formed from these materials by molding under pressure and temperature. The flexible characteristic of the resin is maintained through the molding phase and permits differential shrinkage to occur without fabric-resin separation. The molded part is however self supporting and the resin matrix may thereafter be partially carbonized at an appropriate temperature level. Following this the entire part may be graphitized at an elevated temperature in an inert atmosphere, followed by infiltration and reimpregnation if desired.

9 Claims, No Drawings

MATCHING THE VOLUME SHRINKAGE OF ORGANIC FIBERS TO THAT OF THE RESIN MATRIX IN CARBON OR GRAPHITE COMPOSITES

BACKGROUND OF THE INVENTION

This invention relates to carbon-carbon composite parts and methods of making the same, and particularly to improvements in such art which provide greater uniformity, reliability and interlaminar shear strengths in the product and lower failure rates in processing.

As the usage of carbonized composite products has increased, there have been concurrent attempts to improve such products and the methods of their manufacture. For insulative applications, the reinforcement material may comprise relatively low cost fibrous constituents, but where superior strength is desired and particularly where ablative conditions may be encountered, fabric reinforcements are utilized. It is well known that the strength of the interface between the surfaces of the fibrous material and the encompassing resin matrix is largely determinative of the physical integrity and the strength of a part having a given configuration. Achieving an intimate and chemical bond between the constituents of the composite is not as significant with random fibrous materials but presents significant problems in processing composites employing fabric materials.

The term "carbon" is here used in a generic sense to encompass both carbon and graphite materials, and where it is intended to refer to carbon that has not reached substantially graphitic form the specific term "amorphous carbon" will be employed. Fully carbonized or graphitized materials are not readily capable of intimate chemical bonding with matrix materials, because the surfaces of the fibers are relatively inactive and prevent good wetting of the fibers. Partially carbonized materials have active surfaces in which there is a residue of carboxyl-hydroxyl groups, to which an impregnating resin may readily adhere. However, in molding a part of this nature the differential heat expansion and contraction between the fabric and the resin can be substantial. Because the fabric layers are oriented in given directions, differential shrinkage effects, combined with the close adhesion between the resin and the fabric surfaces, typically can cause the composite product to literally tear itself apart. This is manifested either in cracking of the part in glass-type breaks, or in the appearance of small cracks, or in a tendency readily to delaminate under stress conditions. These cracks may appear during molding, during subsequent cooling of the part or during usage of the part in an operative condition.

Such internal stressing of products arising from intimate chemical bonds in the composite, results in both substantially lower yields in production of product, and loss of reliability in the finished product. What is desired is to have a readily achievable process for fabricating product in which the chemical bond between the matrix and the fibrous reinforcement is intimate, so that interlaminar shear strength is high, without tendency to crack or introduce imperfections during processing or tendency to delaminate in usage.

It has been suggested to form carbon-carbon composites using thermoplastic materials, but these maintain a largely fluid condition during processing and are not suitable for thin wall structures and complex shapes. As pointed out in U.S. Pat. No. 3,107,153, some have attempted to avoid the necessity of support by using particular thermosetting carbonaceous materials in combination with thermoplastic materials. Such techniques, however, appear suitable only for monolithic or non-composite types of bodies. U.S. Pat. No. 3,579,401 suggests the concurrent carbonization of a viscose rayon felt and a polymerized furane resin. It is said that the resin and felt have a shrinkage of the same order of magnitude. Such an approach does not of course provide an intimate fiber-matrix bond and there can be wide disparities in shrinkage rates within an order of magnitude. As another approach, U.S. Pat. No. 3,233,014 suggests carbonization of a composite product under pressure followed optionally by deposition of pyrolytic graphite to increase density, but this is both infeasible with most complex shapes and non-productive in improving the carbon-carbon bond. An important further aspect is that it is desirable to avoid cooling of formed parts because non-accessible internal cracks can be introduced that are not filled during subsequent deposition.

SUMMARY OF THE INVENTION

Methods in accordance with the invention of making composite parts commence with partial carbonization of a fabric precursor. The fabric is then impregnated with a flexible thermosetting matrix material having a self-supporting characteristic at elevated temperatures. Such a combination forms an intimate carbon-carbon bond of chemical nature that remains after pyrolysis. Parts may be molded in thin wall configurations at a temperature lower than that at which the matrix material rigidifies, after which the matrix may be partially carbonized and then the composite part may be fully graphitized.

In a more specific example of a process in accordance with the invention, a carbonizable rayon fabric precursor is pyrolized in an inert atmosphere to a temperature of approximately 1,600° F., and then impregnated with a flexible thermosetting resin, such as a furfuryl alcohol copolymer, having an integral self-supporting characteristic but substantial flexibility to the temperature at which it begins to carbonize. Preferably, the volume shrinkage characteristics of the matrix material and the fabric are matched as closely as possible. Thereafter, a shape, which may be a thin wall or complex configuration, is laid up with layers of the impregnated material and molded at selected temperatures and pressures below the carbonizing temperature. The molded shape is thereafter heated to approximately 900° F. in an inert atmosphere to partially carbonize the resin, following which the composite part may be graphitized at a temperature in excess of 3,500° F. in an inert atmosphere. Alternatively, parts may be made starting with polyacrylonitrile (PAN) precursor, and may be infiltrated or reimpregnated to fill voids and increase density.

DETAILED DESCRIPTION OF THE INVENTION

EXAMPLE I

The following detailed example of a method of making a carbon-carbon composite is illustrative of methods in accordance with the invention.

1. A partially carbonized fabric having significant surface reactivity is prepared by carbonizing a viscose rayon precursor through the successive time-temperature heating stages of a process such as taught by Millington, U.S. Pat. No. 3,294,489, but limiting the maximum temperature to approximately 1,600° F.

2. The fabric was impregnated by being submerged in an open container of flexible, thermosetting furfuryl alcohol copolymers in accordance with Shaffer, U.S. Pat. No. 3,544,530. Excess resin was removed by drawing the fabric between pressure rollers.

3. The impregnated fabric was dried by hanging in air at ambient temperature to permit evaporation of a portion of the solvent originally in the resin.

4. The dried impregnated fabric was placed in an air circulating oven to advance the polymerization of the resin and remove additional solvent, at temperatures of approximately 150° F. for approximately one-half hour. This temperature treatment advanced the impregnation to the B stage.

5. The impregnated fabric was cut into sections of chosen size and shape that were then laid up in the desired shape, a cylinder in this particular example. The fabric layers may be disposed in selected orientations in the part when particular ablative or other conditions are to be met.

6. The part was unified and densified and the matrix material was cured in a conforming mold in an electrically heated platen press at approximately 1,000 psi and 350° F. for approximately 2 hours. The length of time required for cure in dependent on a number of factors, including significantly the wall thickness and the shape of the part being cured and therefore can be highly variable, from perhaps 1 hour for a small test part to 24 hours for large thick walled shaped. Inasmuch as these factors are well known to those skilled in the art they need not be discussed in detail. When removed from the mold, the part had the desired high degree of fiber-matrix adhesion but was free of the fracture tendency heretofore encountered. Furthermore the part was adequately self supporting for maintenance of its shape and dimensions through further processing steps. Also, between such steps the part did not have to be cooled to lower temperature but could be directly transferred to the next stage.

7. The resin matrix was partially pyrolized by heating at successively higher steps in an inert atmosphere to approximately 900° F., in an electrical resistance furnace. The matrix retained its flexible, self-supporting characteristic well into the carbonization stage beginning at about 500° F.

8. The part was then fully carbonized and carried to a graphitic state by heating to approximately 4,000° F. in a retort heated by an electrical induction furnace. This step completed the conversion of partially carbonized reinforcement and resin and advanced graphite crystallinity.

9. The part was then removed and without being permitted to cool was infiltrated with pyrolytic graphite by heating in an electrical induction furnace, within a retort into which hydrocarbon gas was introduced. The time and temperature used was in accordance with known techniques for the deposition of pyrolytic graphite to complete infiltration of voids introduced during the pyrolysis of the resin and reinforcement in the prior steps.

Parts produced in accordance with the above sequence of steps have a number of outstanding properties. The wetting of partially carbonized reinforcement fibers provides an intimate bond between the resin and the residual carboxylhydroxyl surface groupings on the fibers, which are thereafter converted by pyrolysis to intimate chemical carbon-to-carbon bonds. This chemical bonding gives substantially greater interlaminar shear strength in the product, and greatly reduces tendencies of the part to delaminate.

This carbon-carbon system also is characterized by an essentially homogenous isotropic matrix characteristic. This results from the fact that the reinforcement and the matrix both are converted to a near graphite state at the same time.

The use of a flexible thermosetting resin is of significance to this process. Preferably, the volume shrinkage characteristics of the reinforcement and the resin are matched as closely as possible, within the limits of practicality, so that shrinkage of the part and during fabrication and firing is substantially equal in all directions. However, precise matching is impossible, and the reinforcement has relatively low expansion and contraction characteristics whereas the resin matrix has significantly greater expansion and contraction, leading to the differential characteristic that can cause self-destruction. However, the self-supporting nature of the matrix after partial pyrolysis and its flexible characteristic during expansion and contraction, avoids the tendency to crack and have internal failures. The matrix does not become rigid until partial carbonization has been effected. Therefore, after molding, the part can be subjected to the succeeding steps in the process without the necessity of post cure, although this can be used if desired. Furthermore, after graphitization the part need not be cooled down, but can be carried directly to an infiltration step. Cooling at this point can give rise to internal voids of an inaccessible nature that cannot be refilled by the infiltration process.

EXAMPLE II

In this example the sequence used was the same as Example I except for the following differences:

A. The partially carbonized fabric precursor was a polyacrylonitrile (PAN) material instead of rayon, being preoxidized and then partially carbonized to temperatures in the range of 800°–900° F. Shrinkage during partial carbonization was controlled and limited in accordance with known techniques.

B. A flexible thermosetting furfuryl resin was employed including graphite filler particles that enhanced the escape routes for the gases of decomposition.

This process, carried through graphitization, resulted in a high strength, high modulus composite retaining the fracture free characteristic. Higher modulus was achieved because of the initial treatment of the PAN fibers, followed by restraint of the fibers in the matrix during final graphitization, so as to eliminate shrinkage. In addition, the matrix upon graphitization acquired a homogenous isotropic characteristic and a graphitic structure corresponding to that of the reinforcement.

Although there have been described above various expedients and alternatives for methods in accordance with the invention, it should be understood that the invention encompasses those modifications and variations falling within the appended claims.

What is claimed is:

1. In a method of making a carbon fiber reinforced carbon composite article which comprises combining a carbonizable fabric or fiber precursor with a carbonizable matrix comprising a thermosetting resin, molding to desired shape, curing, carbonizing and graphitizing the shaped article, the improvement comprising:

selecting a carbonizable matrix comprising a thermosetting resin, selecting a carbonizable fiber or fabric having a volume shrinkage during carbonization greater than that of the selected matrix, and partially carbonizing said fiber or fabric prior to combining it with said matrix to reduce its volume shrinkage to match the volume shrinkage of said matrix.

2. The invention as set forth in claim 1 above, wherein the matrix consists essentially of a resin.

3. The invention as set forth in claim 1 above, wherein said thermosetting resin comprises a furfuryl alcohol copolymer forming a chemical carbon-to-carbon bond with the fiber or fabric after carbonization is completed.

4. The invention as set forth in claim 1 above, wherein the matrix comprises filler particles contained in a resin.

5. The invention as set forth in claim 4 above, wherein said filler particles comprise graphite particles.

6. The invention as set forth in claim 1 above, wherein the precursor is a polyacrylonitrile material and the partial carbonizing temperature is approximately 800° to 900° F.

7. The invention as set forth in claim 1 above, wherein the precursor is a rayon material, and the partial carbonizing temperature is approximately 1,600° F.

8. The invention as set forth in claim 1 above, wherein the partial carbonizing comprises heating the fiber or fabric to approximately 900° F. in an inert atmosphere and the graphitizing comprises heating the shaped article to a temperature in excess of 3,500° F. in an inert atmosphere.

9. The invention as set forth in claim 1, further including the step of pyrolytically infiltrating the carbonized composite article with carbon material.

* * * * *